United States Patent
Feigel et al.

(10) Patent No.: US 6,193,328 B1
(45) Date of Patent: Feb. 27, 2001

(54) HYDRAULIC ANTI-LOCK BRAKE SYSTEM AND CIRCUIT ARRANGEMENT THEREFOR

(75) Inventors: Hans-Jorg Feigel, Rosbach; Ronald Bayer, Muhlheim/Main; Johann Jungbecker, Badenheim, all of (DE)

(73) Assignee: Continental Teves AG & Co., OHG (DE)

( * ) Notice: Subject to any disclaimer, the term of this patent is extended or adjusted under 35 U.S.C. 154(b) by 0 days.

(21) Appl. No.: 09/202,706

(22) PCT Filed: Apr. 26, 1997

(86) PCT No.: PCT/EP97/02174
§ 371 Date: Oct. 27, 1999
§ 102(e) Date: Oct. 27, 1999

(87) PCT Pub. No.: WO97/48584
PCT Pub. Date: Dec. 24, 1997

(30) Foreign Application Priority Data

Jun. 19, 1996 (DE) .............................. 196 24 331

(51) Int. Cl.[7] ...................................... B60T 8/34
(52) U.S. Cl. ...................... 303/113.4; 303/9.62; 303/155; 303/113.5
(58) Field of Search ................ 303/113.4, 155, 303/186, 9.62, 113.5

(56) References Cited

U.S. PATENT DOCUMENTS

| | | | |
|---|---|---|---|
| 4,576,419 | * 3/1986 | Leiber | 303/113.4 |
| 4,790,607 | 12/1988 | Atkins . | |
| 5,201,573 | * 4/1993 | Leiber et al. | 303/113.4 |
| 5,333,942 | * 8/1994 | Peczkowski et al. | 303/113.4 |
| 5,564,797 | * 10/1996 | Steiner et al. | 303/113.4 |
| 5,676,435 | * 10/1997 | Breitenbacher et al. | 303/155 |
| 5,816,667 | * 10/1998 | Jokic | 303/113.4 |

FOREIGN PATENT DOCUMENTS

| | | |
|---|---|---|
| 443028 | 1/1968 | (CH) . |
| 1 655 383 | 3/1972 | (DE) . |
| 1 555 520 | 4/1972 | (DE) . |
| 25 27 471 | 12/1976 | (DE) . |
| 31 09 372 | 9/1982 | (DE) . |
| 43 34 838 | 4/1995 | (DE) . |
| 94/12377 | 9/1994 | (WO) . |

OTHER PUBLICATIONS

Search Report of the German Patent Office for Application 196 24 331.9.

* cited by examiner

Primary Examiner—Douglas C. Butler
Assistant Examiner—Robert A. Siconolfi
(74) Attorney, Agent, or Firm—Rader, Fishman & Grauer PLLC

(57) ABSTRACT

A hydraulic brake system with electronic anti-lock control contains, as essential components, a pedal actuated brake pressure transducer (1), electrically actuated inlet and outlet valves ($EV_1$ to $EV_4$, $AV_1$ to $AV_4$), wheel sensors (S1 to S4) and an electronic control circuit (6). The brake pressure transducer (1) is equipped with one or more path sensors (5), for the direct or indirect determination of the pedal path (S). Interdependent with the current driving conditions, the brake situation and the pedal path (S), the anti-lock control is switched from a standard control mode into a safety control mode, which essentially permits only a brake pressure increase in the front wheels and a brake pressure decrease in the rear wheels during an anti-lock control procedure. A limit value ($S_{pGrenz}$) of the pedal advancement is determined interdependent with the driving conditions and the brake situation, and upon exceeding such a switch over takes place into the safety control mode.

18 Claims, 2 Drawing Sheets

HYDRAULIC ANTI-LOCK BRAKE SYSTEM AND CIRCUIT ARRANGEMENT THEREFOR

BACKGROUND OF THE INVENTION

The invention relates to a hydraulic motor vehicle brake system with electronic anti-lock control, with a pedal actuated brake pressure transducer, with electrically actuated pressure medium inlet valves and outlet valves inserted into the pressure medium paths, by which the inflow of pressure medium into the wheel brakes of the individual wheels and the pressure medium drainage into a pressure equalization reservoir of the brake system are individually controlled, with wheel sensors to determine the rotational relationship of the wheels, as well as with an electronic control circuit to evaluate the sensor signals, to determine the driving conditions and to generate the brake pressure control signals.

A circuit arrangement for a brake system with electronic anti-lock control is also a constituent of the invention.

anti-lock braking systems (ABS) are available in many different types. Hydraulic systems in which the wheel brakes of the individual wheels are connected to a multi-circuit brake pressure transducer or master cylinder by means of electrically actuated hydraulic valves have proven themselves to be of particular value. An inlet valve is located in the pressure medium path from the master cylinder to the wheel brake, switched to through-flow when in its normal position, while it switches to the blocking position when in the constant pressure phase or in the pressure reduction phase. An outlet valve blocked when in the resting position is located in the return flow line which leads from the wheel brake to the low pressure reservoir or—in open systems—to the pressure equalization reservoir of the brake system. To return the pressure medium drained off during the pressure reduction phase, depending on the system, a return flow pump (in closed systems) or a hydraulic pump that advances fluid from the pressure equalization reservoir into the brake circuit (in open systems) is used.

The reduction of manufacturing expenses for such antilock braking systems (ABS) resulting from the simplification of the system and its components, from skillful construction of the hydraulic brake circuit, from the elimination of components and from the transfer of functions to the allocated electronics has been the object of intensive investigation for some considerable time. These efforts are fundamentally constrained by the fact that a brake system is also expected to perform with the highest reliability even under unfavorable, seldom arising circumstances. An "exhaustion" of the pressure medium volume required for effective braking—as a consequence of frequent, long lasting pressure reductions on a smooth road or under rapidly changing road conditions must naturally be avoided in order to maintain proper brake operation.

An important cost factor for such anti-lock systems is represented by the hydraulic pump and the associated electro-motor drive. It is therefore now recommended that a pump-less ABS be developed. An example of this is the brake system known from DE 31 09 372 A1, which provides that pressure medium drained off by means of outlet valves in order to regulate the anti-lock protection be collected in a low pressure reservoir, from where, after releasing the brakes, it can then flow back into the brake circuit. This known system contains two brake circuits with a diagonal brake circuit subdivision, whereby each brake circuit is equipped with a common inlet/outlet valve arrangement and additionally with a further, electrically switchable inlet valve which is inserted in the pressure medium path leading to the rear wheel brake. This inlet valve can, on the one hand, be switched into a blocking position interdependent with the anti-lock control, and on the other hand interdependent with the load. Completely independent control of all wheels, however, is not provided.

Furthermore, a two circuit hydraulic brake system with anti-lock control is known from DE 43 34 838 A1, by which the pressure medium that is led away from the wheel brakes in the brake pressure reduction phase reaches the low pressure reservoirs, which have two separated inlets for the connection of a rear wheel and a front wheel. Upon achieving a predetermined degree of filling of the reservoir the pressure medium inflow from the front wheel brake, and thereby a further pressure reduction on the front brake, is blocked. Up to this point in time there are hardly any limits on the ABS operation, although the volume through-flow is drastically reduced with the help of specific control algorithms. When a locking of the front wheel is sensed, a switch-over of the control algorithm for the rear wheel is carried out, and a locking of the rear axle is avoided (safety control mode). Maintenance of the brake function is assured by the limited volume uptake of the low pressure reservoir.

The present invention now has the basic object of developing a pump-less ABS of this type, that functions without the use of a low pressure reservoir and that, even under unfavorable circumstances, still features the desired high reliability of operation.

SUMMARY OF THE INVENTION

It has been shown that this object can be achieved with a motor vehicle brake system, the particular nature of which resides in the fact that one or more path sensors are provided for directly or indirectly determining the path and/or the position of the pedal and/or of the piston of the brake pressure transducer, that the anti-lock control can be switched from a standard control mode into a safety control mode interdependent with the current driving or road conditions, the brake conditions and the advancement or the position of the pedal or of the piston. and that in the safety control mode a further reduction in brake pressure in the front wheel brakes, and a further brake pressure increase in the rear wheel brakes is limited, delayed or even blocked during an anti-lock control procedure by means of the switching of the control.

According to the invention a pump-less ABS based on an open system is developed that includes one or more pedal path sensors and that, as a result of switching into a safety control mode when certain conditions are at hand, makes a full-ranging "complete" ABS control possible and at the same time assures that the braking function is also maintained, even under very unfavorable conditions. According to a particularly advantageous exemplified embodiment of the invention a limiting value for the pedal advancement is determined interdependent with the current driving (road) conditions, the brake conditions and the pedal path, whereby when this limiting value is exceeded the switch-over of the standard control mode into the safety control mode takes place.

The limit value is expediently predetermined as a function of the current vehicle deceleration, taking into consideration the volume uptake characteristic of the respective wheel brake. However, it is also possible, and in many cases advantageous, to predetermine the limit value ($S_{pGrenz}$) of the pedal advancement interdependent with the pedal position upon initiating the anti-lock control, and interdependent with the pedal path available for the control according to the relationship $S_{pGrenz} = S_{pStart} + S_{pReg}$.

Furthermore, a circuit arrangement for a brake system of this type is indicated, which can basically be employed advantageously for pump-less ABS with a low pressure reservoir. This circuit arrangement could also increase the operating reliability of an ABS that is equipped with a hydraulic pump, for example by assuring brake functioning in extremely unfavorable circumstances for which the auxiliary pressure supply or the hydraulic pump was either not designed or for which it is insufficient.

Other characteristics, advantages and possible applications of the invention become evident from the following specification of further details, based on the attached illustrations.

DETAILED DESCRIPTION OF THE DRAWINGS

Figure 1:
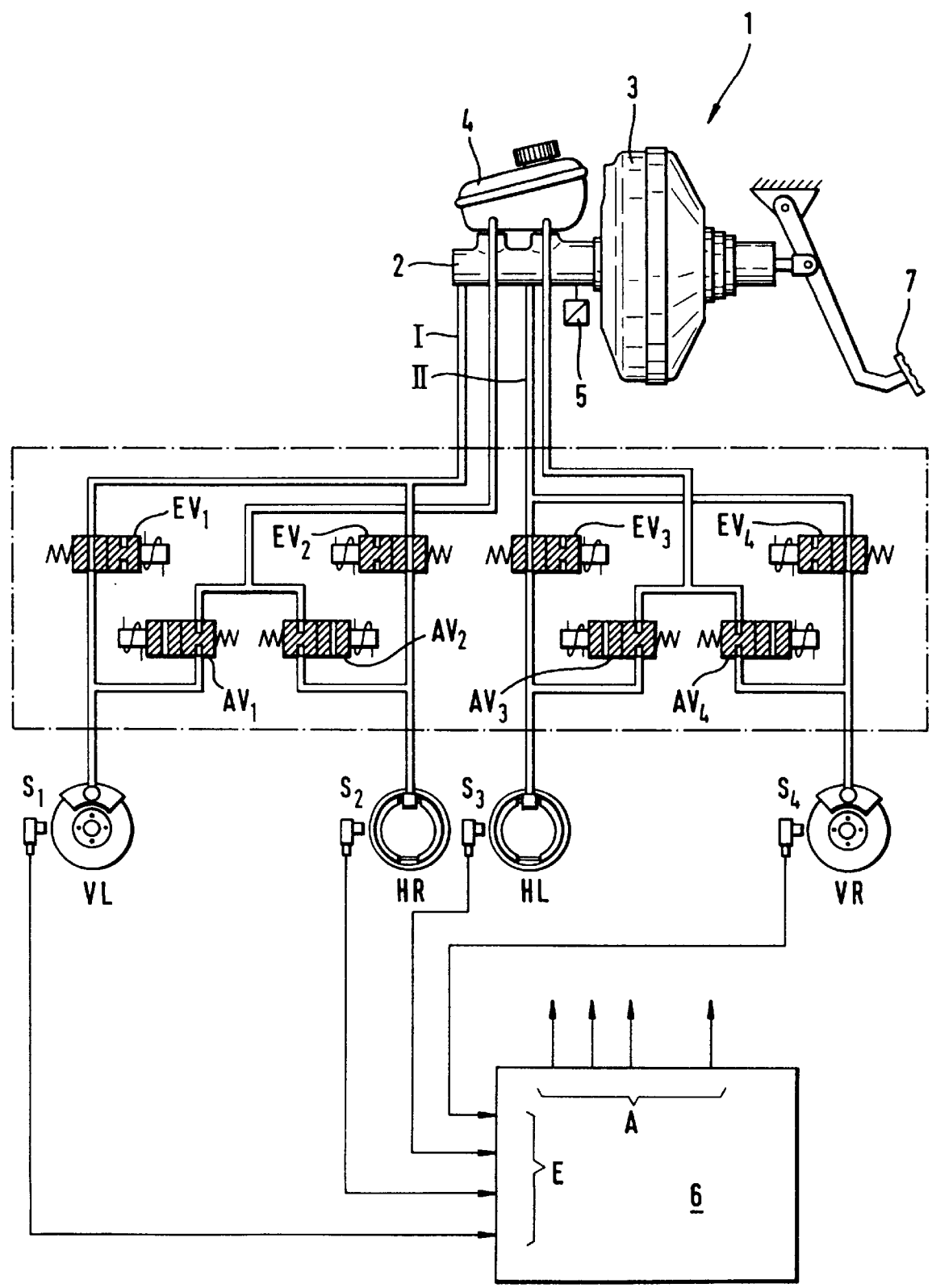
FIG. 1 shows a schematic illustration of the most important components of an anti-lock brake system according to the invention.

In the exemplified embodiment of the invention according to FIG. 1, the motor vehicle brake system comprises a brake pressure transducer 1 which, in this case, is constructed in the form of a tandem master cylinder 2 with a series connection of a pedal actuated (pedal 7) low pressure amplifier 3. A pressure equalization reservoir 4 and a pedal path sensor 5 are also constituents of the brake system.

In the pressure medium paths or the brake circuits I, II, by means of which the wheel brakes of the front wheels VL, VR and the rear wheels Hr, HL are connected in a diagonal brake circuit subdivision, there are electrically actuated inlet valves $EV_1$ to $EV_4$ that are switched to flow-through when in the resting position or when in the normal position. The wheel brakes of the individual wheels VL, VR, HR, HL are connected to the pressure equalization reservoir 4 of the pressure transducer 1 by means of outlet valves $AV_1$ to $AV_4$ that are closed when in the normal position. The illustrated brake system, in contrast to the known anti-lock systems of this type, requires neither an auxiliary pressure supply system nor any hydraulic reservoir.

Each wheel VL, VR, HL, HR is equipped with a wheel sensor that, in a known manner, supplies a signal that represents the rotational relationship of the wheel to the input E of a control circuit 6. This control circuit 6 symbolizes a hard wired or—advantageously—a program controlled circuit arrangement designed based on microcontrollers, said a circuit arrangement that processes the wheel signals supplied by wheel sensors S1 to S4 by means of data processing, and generates brake pressure control signals. The individual inlet and outlet valves $EV_1$ to $EV_4$ and $AV_1$ to $AV_4$ are connected to the control circuit 6 by means of outputs A.

According to the invention an "open" hydraulic system is used, whereby basically a pressure decrease or a pressure medium drain into a pressure equalization reservoir is possible without limits. Therefore, a pedal path sensor 5 is required in order to be able to recognize the maximal permissible pedal path, or whether sufficient residual volume has been maintained.

The path sensor 5 can advantageously be lodged in a control unit flanged onto the master cylinder in order to avoid guiding the cable externally. For example, the axial advance of the pedal rod can be determined with the aid of Hall sensors, or the piston can be sensed magnetically, if such a path sensor is employed in an appropriate recess in the wall of the main cylinder.

In the case of such an open system in connection with the path sensor, a brake system with particularly high operational reliability can be realized. This should be explained by the following examples:

If an outlet valve is not sealing, then this can be sensed by the brake system according to FIG. 1, as follows:

(1.) The vehicle deceleration determined by evaluating the wheel sensor signals is associated with a pedal position that is provided with a tolerance range. If the pedal position determined using the path sensor 5 is outside of this tolerance range, then an error is at hand in the brake system. This error may also be a poor aeration condition.

(2) The wheel slippages of all wheel brakes are compared. If a circuit is lost, the slippage values of the wheels of the lost circuit exhibit low values.

(3) The inlet valve of the rear wheel brake is closed, and the following is observed:

(a) The wheel slippage of the rear wheel decreases, the wheel slippage of the front wheel increases if the pedal position is raised further, or:

(b) the wheel slippage of the rear wheel remains constant, the wheel slippage of the front wheel does not increase proportionally if the pedal position is raised further, or:

(4) if (a) occurs, then the inlet valve of the rear wheel remains closed and the warning light is triggered. The outlet valve is actuated a multitude of times in order to flush out any dirt that may be present. If there is no improvement, then the associated inlet valve is closed upon each actuation of the brake. There can, for example, also be a defect in a sealing collar of the wheel brake. The effect on the driver will be that: he has a short pedal and can still activate three wheel brakes—even if a wheel brake cylinder seal has given out. In contrast to a corresponding closed system, where the loss of a wheel brake seal leads to the total loss of the circuit, in this system there are clearly improved conditions, as a result of the short pedal path and the improved brake action from three wheel brakes. Therefore, the open system is more reliable than a corresponding closed hydraulic system.

The same is true for case (b), whereby the inlet valve of the front wheel is then closed. If no improvement occurs in brake behavior following this, then the main cylinder collar may be defective. The warning light is activated.

Figure 2:
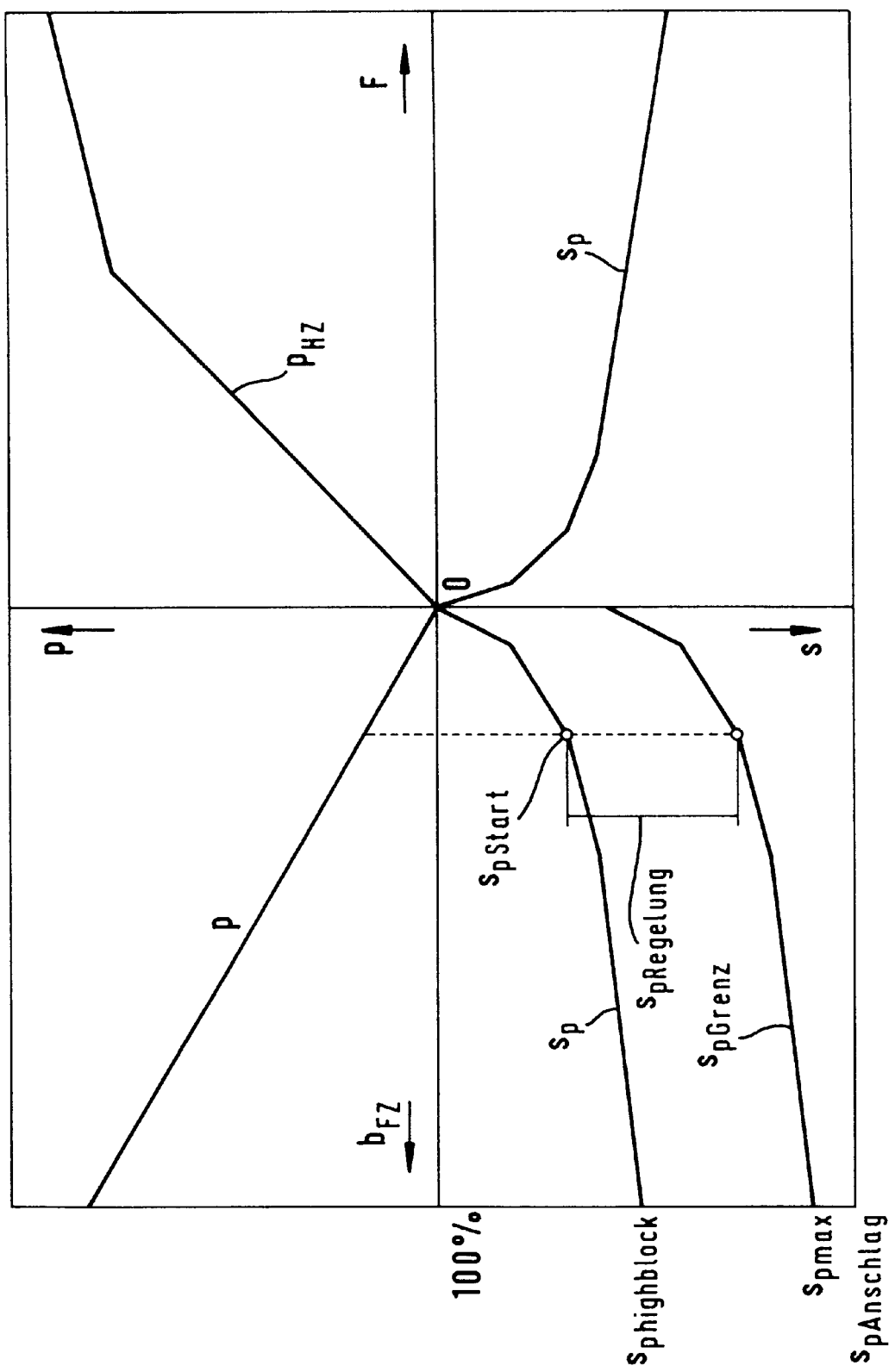
FIG. 2, in a diagram, the interdependence of the pedal path and the pedal limit values with the vehicle deceleration in a brake system according to FIG. 1.

FIG. 2 serves to illustrate the principle mode of operation of the brake system according to the invention. The pressure $P_{HZ}$ interdependent with the pedal force F, the pedal path or the pedal advancement S interdependent with the vehicle deceleration $b_{FZ}$ are shown. The difference between the two illustrated curves $S_p = f(b_{FZ})$ and $S_{pGrenz(Limit)} = f(b_{FZ})$, as is explained in more detail in the following, represents the pedal path $S_{pReg}$ available for the control. Additionally, the interconnection between the vehicle deceleration bFz and the brake pressure p is indicated. The empirically determined or calculated limit value of the pedal advancement $S_{pGrenz(Limit)}$ interdependent with the vehicle deceleration is derived by considering or adding the pedal path $S_{pReg}$ made available for the anti-lock control. The difference between $S_{pmax}$ and $S_{pAnschlag(stop)}$ that can be seen in the illustration takes into consideration manufacturing tolerances, dimensional errors and other deviations of different types.

The operation of the brake system according to the invention is clarified by the following situational examples:

1. Braking on a roadway with a homogenous, high coefficient of friction ($:_{hihom}$):

The brake pedal is actuated by the driver with the full force of the foot F. The brake pressure that increases as a result of the filling of the wheel brakes reaches a locking pressure level.

The tendency of a respective wheel to lock is sensed through the behavior of the wheel and leads to a triggering and blocking of the relevant inlet valve EV by means of the control circuit 6 (FIG. 1). Should a pressure reduction be required to reestablish wheel stability, the accompanying outlet valve AV is additionally opened for the calculated time span or switched to flow-through.

ABS control then follows in a manner that is expediently designed such that it arises with the smallest possible volume flow-through or volume drain—of course without impairing the anti-lock control.

The brake pedal movement during this braking process is determined and evaluated with the help of the path sensor 5, expediently the accompanying electronics is also lodged in the control circuit 6.

As long as the vehicle is braked with maximal possible deceleration ($b_{FZ}$), where in the present case a braking procedure is to be expected with a homogeneous, high friction coefficient, it need only be made certain that the pedal advancement does not exceed a pregiven maximal value $S_{pmax}$. The advancement up to the stop of the main cylinder piston is depicted diagrammatically according to FIG. 2 by $SP_{Anschlag(stop)}$. If one reduces this advancement or pedal path by a safety margin which, among others, takes into consideration the manufacturing tolerances, then one obtains the maximal permissible advance or pedal path $S_{pmax}$.

If the advancement or the pedal reaches this advancement or this position $S_{pmax}$ at maximal deceleration, then according to the invention measures are initiated that no longer permit the pressure in the wheel brakes of the front wheels to decrease, or only decrease very slightly. This is achieved most simply by blocking the triggering of the outlet valve, or at least through the appropriate limitation of the triggering times of this front wheel outlet valve.

Additionally, since the previously indicated limit value has been reached, the anti-lock control is limited on the rear wheels. Only a brake pressure reduction in the rear wheel brakes is permitted, in order to assure the driving stability of the vehicle. This goal is most simply achieved by triggering the inlet valve EV, that is by blocking this inlet valve.

According to the invention, upon reaching the limit value $Sp_{Grenz(Limit)}$, the anti-lock control is switched from the standard control mode, whereby a brake pressure reduction followed by an increase in the front wheel brakes as well as in the rear wheel brakes is permissible, into a safety control mode. This safety control mode now only permits, as previously explained, an unimpeded brake pressure increase at the front wheels and a brake pressure decrease at the rear wheels, in order to ensure braking action and driving stability, is carried out without any or with at most very little pressure medium consumption.

2. Braking on a roadway with a homogeneous, low coefficient of friction ($:_{lohom}$):

The braking process starts again with a "normal" ABS control; the standard control mode applies.

The vehicle, corresponding to the low coefficient of friction, can only be braked with a slight deceleration $b_{FZ}$. There is only relatively little brake fluid in the wheel brakes, corresponding to the low pressure. A change in the roadway to a higher or maximal coefficient of friction ($:_{hi}$) is possible at any time; this higher coefficient of friction should in every case be used entirely or at least to a large degree for the braking procedure, without exceeding the maximal pedal path $S_{pmax}$. This implies that the pressure medium volume necessary for this must be stored in the master cylinder. Therefore, according to the invention the control must be designed such that at a relatively low vehicle deceleration $b_{FZ}$—see FIG. 2—the ABS control is not maintained up to the point of achieving the maximal pedal position $S_{pmax}$. This is shown by the progression of the curve $S_{pGrenz}$, interdependent with the vehicle deceleration $b_{FZ}$ in FIG. 2.

The pedal position after which the ABS control is limited at low friction values is designated as $S_{pGrenz}$. This value $S_{pGrenz}$ is dependent on the current vehicle deceleration $b_{FZ}$ and by the volume—uptake characteristic of the wheel brakes; the approximate progression as illustrated in FIG. 2 results.

Mathematically, the advance or pedal value limit $SP_{Grenz}$ can be determined according to FIG. 2, as follows:

The advancement or the pedal position during the implementation of an anti-lock control is designated as $S_{pstart}$. For control, an additional pedal path $S_{pReg}$ is provided. This pedal path corresponds at first approximation to the difference between the maximal permissible pedal path $S_{pmax}$ and the pedal position upon reaching the locking pressure level at a high, homogeneous coefficient of friction. This pedal path is specified by $Sp_{hiblock}$ in FIG. 2. For the pedal limit value $S_{pGrenz}$ the relationship $$S_{pGrenz}=S_{pStart}+S_{pmax}-S_{phiblock} \text{ is valid.}$$

The difference $S_{pmax}-S_{phiblock}$ approximately reflects the pedal path made available again for the control—see FIG. 2.

If the advancement reaches the position $S_{pGrenz}$, according to the invention—as previously—a switch over from the standard control mode to the safety control mode takes place. By triggering the valves it is ensured that only a brake pressure increase at the front wheels and a brake pressure decrease at the rear wheels—not including small corrective measures—is permissible or takes place.

When the coefficient of friction $:_{lo}$ remains the same, the vehicle is braked with nearly optimal deceleration while maintaining the ability to steer it and driving stability. When there is a slippage that is either distinct or slight as a consequence of the change to a higher coefficient of friction, the brake system according to the invention has its brake pressure increased further, but not any longer on the front axle or, at most, to a slight degree.

3. Braking procedure on roads with varying coefficients of friction right/left ($:_{split}$):

At the start the braking is again subject to the standard control mode.

As a consequence of the $:_{split}$ situation, the vehicle can only be decelerated at medium deceleration, corresponding to the coefficients of friction. The wheel brakes are filled with brake fluid to varying degrees. It is possible that at any time there could be a change to a higher or even a maximal coefficient of friction on the roadway, while at the moment the coefficient of friction is low. Of course, the higher coefficient of friction should in turn be used for braking. This means that the brake fluid volume necessary for this must be provided in the master cylinder. Therefore, according to the invention, in this driving situation an unlimited ABS control is also not permitted up to a maximum advancement of $S_{pmax}$.

The limit value $S_{pGrenz}$ is again valid as the permissible advancement. As FIG. 2 illustrates, the vehicle deceleration $b_{FZ}$, which is higher in comparison to a braking procedure at the lowest coefficient of friction ($:_{lo}$), leads to a higher permissible advancement or pedal path limit value $S_{pGrenz}$.

The previously described calculation of the permissible pedal path limit value $S_{pGrenz}$ in connection with a braking procedure at the lower coefficient of friction ($:_{lo}$) is also valid for the present $:_{split}$-situation.

Upon achieving the permissible pedal position $S_{pGrenz}$ there is again, as previously described, a switch from the standard control mode into the safety control mode.

At a constantly varied coefficient of friction right/left the vehicle equipped with the brake system according to the invention is braked with almost optimal deceleration, while maintaining the ability to steer and driving stability to the point of coming to rest. If, as a consequence of a change to a higher coefficient of friction, a brake slippage ranging from distinct to slight is determined, then the brake pressure at the front axle is further increased, but can then no longer be decreased.

When using a brake system with a tandem master cylinder it is basically possible, with the help of individual path sensors, to determine the movement of both pistons and to evaluate it. At that point a limit value $S_{pGrenz}$ is determined for each individual piston, and in turn is used to evaluate whether there will be a transfer or switch over from standard control mode to the safety control mode.

In many cases, however, it is sufficient and, for reasons of savings, expedient, to merely determine the advancement of the pressure rod piston of a tandem master cylinder with the help of path sensors 5 (FIG. 1). Any variation in the volume consumption in the two brake circuits of the tandem master cylinders can, of course, not be determined on the basis of the measurement of the advancement of the pressure rod piston alone. Therefore, by determining and evaluating the valve switching times, in particular the flow-through time periods of the inlet valves EV, the varying volume consumption can be approximately determined during an anti-lock control procedure. By including a higher safety margin when calculating or empirically determining the limit value $S_{pGrenz}$, in this case the maximal possible deviation of the estimated value from the actual value can be taken into account and possible errors can thereby be balanced out.

Reference is now made to the fact that a circuit arrangement of the type described here, which permits the determination and consideration of a maximal permissible pedal limit value $S_{pGrenz}$ and has the consequence of a switch over from a standard control mode into a safety control mode upon reaching or exceeding this limit value, could also be of advantage for anti-lock protected brake systems that are equipped with a hydraulic pump and/or with a pressure reservoir. By such measures the operational reliability of the brake system can be increased in certain cases without any noteworthy additional manufacturing or production expenses.

What is claimed is:

1. A hydraulic anti-lock brake system for a four-wheel vehicle with a wheel brake for each wheel, with a pedal actuated brake pressure transducer, with electrically actuated pressure medium inlet valves and outlet valves inserted in the pressure medium paths, with which the pressure medium inflow into the wheel brakes of the individual wheels as well as the pressure medium drain into a pressure equilibration reservoir of the brake system are individually controlled, with wheel sensors to determine the rotational relationship of the wheels, with at least one path sensor to determine the position of the pedal or of pistons of the brake pressure transducer, as well as with an electronic control circuit to evaluate the sensor signals, to determine the driving conditions and to generate brake pressure control signals, wherein, interdependent with momentary driving and road conditions, the brake situation and the position of the pedal or the pistons, the anti-lock control can be switched from a standard control mode into a safety control mode, which includes that at least a brake pressure decrease in the wheel brakes of the front wheels or a brake pressure increase in the wheel brakes of the rear wheels is limited by the control circuit during an anti-lock control procedure, wherein the limit value $S_{pGrenz}$ of the pedal advancement interdependent with the pedal position is determined by the relationship $S_{pGrenz}=S_{pStart}+S_{pReg}$ when the anti-lock control is implemented, and by a pedal advancement available for control wherein $S_{pStart}$ stands for the pedal advancement before the anti-lock control commences and $S_{pReg}$ for a pedal advancement available for electronic control wherein the pedal advancement available for the control is determined from the difference between the maximal permissible pedal advancement and the pedal advancement at maximal deceleration of the vehicle.

2. A brake system according to claim 1, wherein the control circuit interdependent with the momentary driving or road condition and brake situation determines a limit value for the pedal advancement, and that upon exceeding this limit value the switch over from the standard control mode into the safety control mode takes place.

3. A brake system according to claim 1, wherein the limit value of the pedal advancement is predetermined as a function of the current vehicle deceleration with consideration of a volume uptake characteristic of the wheel brakes.

4. A brake system according to claim 1, with inlet valves and outlet valves for pressure control, wherein, as long as the limit value of the pedal advancement is exceeded, a pressure medium release through the outlet valves of the front wheel brakes is limited. pedal advancement and the pedal advancement at maximal deceleration of the vehicle.

5. A brake system according to claim 1, with inlet valves and outlet valves for pressure control, wherein, as long as the limit value of the pedal advancement is exceeded, a pressure medium inflow through the inlet valves of the rear wheel brakes is limited.

6. A brake system according to claim 1, with a tandem master cylinder as a brake pressure transducer with two hydraulic circuits connected thereto and with a pressure rod piston, wherein a path sensor is exclusively provided to determine the advancement of the pressure rod piston, and that to approximately determine the varying pressure medium volume consumption in the two hydraulic circuits of the brake system control triggering times of the inlet valves are determined and evaluated during a controlled braking operation.

7. A brake system according to claim 1, with a tandem master cylinder as a brake pressure transducer with two hydraulic circuits connected thereto and with two pistons, wherein both pistons of the tandem master cylinder are equipped with path sensors and that for each brake circuit an individual advancement limit value can be determined.

8. Circuit arrangement for a brake system with electronic anti-lock control, with wheel sensors and with pedal path sensors, with electronic circuits to evaluate the sensor signals and to generate brake pressure control signals, wherein the circuit arrangement, interdependent with current driving or road conditions and brake situations, is capable of determining a limit value for a quantity corresponding to the advancement of the pedal, and, upon exceeding the limit value, of switching the anti-lock control from a standard control mode to a safety control mode, whereby in the safety control mode at least a brake pressure decrease in front wheel brakes or a brake pressure increase in rear wheel brakes is limited wherein the safety control mode is maintained as long as the pedal advancement is above a limit value wherein the limit value $S_{pGrenz}$ of the pedal advancement is predetermined, interdependent with the pedal position upon implementation of the anti-lock control and by a pedal advancement available for the control by the relationship $S_{pGrenz}=S_{pStart}+S_{pReg}$, wherein $S_{pStart}$ stands for the pedal advancement before the anti-lock control commences and $S_{pReg}$ for a pedal advancement available for electronic control wherein pedal advancement available for the control is determined from the difference between a maximal permissible pedal advancement and the pedal advancement at maximal vehicle deceleration.

9. Circuit arrangement according to claim 8, wherein the limit value is predetermined as a function of the current vehicle deceleration with consideration of a volume uptake characteristic or characteristic curve of the wheel brakes.

10. Circuit arrangement according to claim 8, wherein circuits are provided which compare at least the momentary pedal advancement or the piston position to the vehicle deceleration derived from the rotational relationship of the wheels, and which evaluate an excess of the predetermined limit values as a criterion for recognizing a faulty condition of the brake system.

11. Circuit arrangement according to claim 8 wherein circuits are provided, which compare wheel slippage values of the wheels connected to various hydraulic brake circuits and signal the occurrence of wheel slippage differences, which are an indication of a faulty condition.

12. Circuit arrangement according to claim 8 for a brake system with outlet valves for pressure release, wherein circuits are provided, which determine and evaluate wheel slippage, interdependent with the valve triggering, and which, if behavior typical of the existence of a dirt particles exists, initiates a flushing of the dirt particle by means of multiple, short term triggering of the associated outlet valves.

13. A hydraulic anti-lock brake system for a four-wheel vehicle with a wheel brake for each wheel, with a pedal actuated brake pressure transducer, with electrically actuated pressure medium inlet valves and outlet valves inserted in the pressure medium paths, with which the pressure medium inflow into the wheel brakes of the individual wheels as well as the pressure medium drain into a pressure equilibration reservoir of the brake system are individually controlled, with wheel sensors to determine the rotational relationship of the wheels, with at least one path sensor to determine the position of the pedal or of pistons of the brake pressure transducer, as well as with an electronic control circuit to evaluate the sensor signals, to determine the driving conditions and to generate brake pressure control signals, wherein, interdependent with momentary driving and road conditions, the brake situation and the position of the pedal or the pistons, the anti-lock control can be switched from a standard control mode into a safety control mode, which includes that at least a brake pressure decrease in the wheel brakes of the front wheels or a brake pressure increase in the wheel brakes of the rear wheels is limited by the control circuit during an anti-lock control procedure wherein the control circuit interdependent with the momentary driving or road condition and brake situation determines a limit value for the pedal advancement, and that upon exceeding this limit value the switch over from the standard control mode into the safety control mode takes place wherein the limit value of the pedal advancement is predetermined as a function of the current vehicle deceleration with consideration of a volume uptake characteristic of the wheel brakes.

14. A hydraulic anti-lock brake system for a four-wheel vehicle with a wheel brake for each wheel, with a pedal actuated brake pressure transducer, with electrically actuated pressure medium inlet valves and outlet valves inserted in the pressure medium paths, with which the pressure medium inflow into the wheel brakes of the individual wheels as well as the pressure medium drain into a pressure equilibration reservoir of the brake system are individually controlled, with wheel sensors to determine the rotational relationship of the wheels, with at least one path sensor to determine the position of the pedal or of pistons of the brake pressure transducer, as well as with an electronic control circuit to evaluate the sensor signals, to determine the driving conditions and to generate brake pressure control signals, wherein, interdependent with momentary driving and road conditions, the brake situation and the position of the pedal or the pistons, the anti-lock control can be switched from a standard control mode into a safety control mode, which includes that at least a brake pressure decrease in the wheel brakes of the front wheels or a brake pressure increase in the wheel brakes of the rear wheels is limited by the control circuit during an anti-lock control procedure wherein the control circuit interdependent with the momentary driving or road condition and brake situation determines a limit value for the pedal advancement, and that upon exceeding this limit value the switch over from the standard control mode into the safety control mode takes place with inlet valves and outlet valves for pressure control, wherein, as long as the limit value of the pedal advancement is exceeded, a pressure medium inflow through the inlet valves of the rear wheel brakes is limited.

15. A hydraulic anti-lock brake system for a four-wheel vehicle with a wheel brake for each wheel, with a pedal actuated brake pressure transducer, with electrically actuated pressure medium inlet valves and outlet valves inserted in the pressure medium paths, with which the pressure medium inflow into the wheel brakes of the individual wheels as well as the pressure medium drain into a pressure equilibration reservoir of the brake system are individually controlled, with wheel sensors to determine the rotational relationship of the wheels, with at least one path sensor to determine the position of the pedal or of pistons of the brake pressure transducer, as well as with an electronic control circuit to evaluate the sensor signals, to determine the driving conditions and to generate brake pressure control signals, wherein, interdependent with momentary driving and road conditions, the brake situation and the position of the pedal or the pistons, the anti-lock control can be switched from a standard control mode into a safety control mode, which includes that at least a brake pressure decrease in the wheel brakes of the front wheels or a brake pressure increase in the wheel brakes of the rear wheels is limited by the control circuit during an anti-lock control procedure further including a tandem master cylinder as a brake pressure transducer with two hydraulic circuits connected thereto and with a pressure rod piston, wherein a path sensor is exclusively provided to determine the advancement of the pressure rod piston, and that to approximately determine the varying pressure medium volume consumption in the two hydraulic circuits of the brake system control triggering times of the inlet valves are determined and evaluated during a controlled braking operation.

16. Circuit arrangement for a brake system with electronic anti-lock control, with wheel sensors and with pedal path sensors, with electronic circuits to evaluate the sensor signals and to generate brake pressure control signals, wherein the circuit arrangement, interdependent with current driving or road conditions and brake situations, is capable of determining a limit value for a quantity corresponding to the advancement of the pedal, and, upon exceeding the limit value, of switching the anti-lock control from a standard control mode to a safety control mode, whereby in the safety control mode at least a brake pressure decrease in front wheel brakes or a brake pressure increase in rear wheel brakes is limited wherein the limit value is predetermined as a function of the current vehicle deceleration with consideration of a volume uptake characteristic or characteristic curve of the wheel brakes.

17. Circuit arrangement for a brake system with electronic anti-lock control, with wheel sensors and with pedal path sensors, with electronic circuits to evaluate the sensor signals and to generate brake pressure control signals, wherein the circuit arrangement, interdependent with current driving or road conditions and brake situations, is capable of determining a limit value for a quantity corresponding to the advancement of the pedal, and, upon exceeding the limit value, of switching the anti-lock control from a standard control mode to a safety control mode, whereby in the safety control mode at least a brake pressure decrease in front wheel brakes or a brake pressure increase in rear wheel brakes is limited wherein circuits are provided which compare at least the momentary pedal advancement or the piston position to the vehicle deceleration derived from the rotational relationship of the wheels, and which evaluate an excess of the predetermined limit values as a criterion for recognizing a faulty condition of the brake system.

18. Circuit arrangement for a brake system with electronic anti-lock control, with wheel sensors and with pedal path sensors, with electronic circuits to evaluate the sensor signals and to generate brake pressure control signals, wherein the circuit arrangement, interdependent with current driving or road conditions and brake situations, is capable of determining a limit value for a quantity corresponding to the advancement of the pedal, and, upon exceeding the limit value, of switching the anti-lock control from a standard control mode to a safety control mode, whereby in the safety control mode at least a brake pressure decrease in front wheel brakes or a brake pressure increase in rear wheel brakes is limited wherein circuits are provided, which compare wheel slippage values of the wheels connected to various hydraulic brake circuits and signal the occurrence of wheel slippage differences, which are an indication of a faulty condition.

* * * * *

UNITED STATES PATENT AND TRADEMARK OFFICE
CERTIFICATE OF CORRECTION

PATENT NO. : 6,193,328 B1
DATED : February 27, 2001
INVENTOR(S) : Hans-Jorg Feigel, Ronald Bayer and Johann Jungbecker It is certified that error appears in the above-identified patent and that said Letters Patent is hereby corrected as shown below:

<u>Column 8,</u>
Lines 38-39, delete "pedal advancement and the pedal advancement at maximal deceleration of the vehicle".

Signed and Sealed this

Tenth Day of September, 2002

*Attest:*

JAMES E. ROGAN
*Attesting Officer*     *Director of the United States Patent and Trademark Office*